US008433459B2

(12) United States Patent
Michel et al.

(10) Patent No.: US 8,433,459 B2
(45) Date of Patent: Apr. 30, 2013

(54) AIRCRAFT GUIDANCE SYSTEM FOR ASSISTING IN AIRPORT NAVIGATION

(75) Inventors: François Michel, Saint Medard en Jalles (FR); Stéphanie Lafon, Merignac (FR); Bernard Dubourg, Le Haillan (FR); Xavier Servantie, Pessac (FR)

(73) Assignee: Thales (FR)

( * ) Notice: Subject to any disclaimer, the term of this patent is extended or adjusted under 35 U.S.C. 154(b) by 392 days.

(21) Appl. No.: 12/849,222

(22) Filed: Aug. 3, 2010

(65) Prior Publication Data

US 2011/0046868 A1 Feb. 24, 2011

(30) Foreign Application Priority Data

Aug. 4, 2009 (FR) ..................................... 09 03846

(51) Int. Cl.

| | |
|---|---|
| ***G01C 23/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl.
USPC .............................................................. 701/3

(58) Field of Classification Search ....................... 701/3
See application file for complete search history.

(56) References Cited

U.S. PATENT DOCUMENTS

| | | | | |
|---|---|---|---|---|
| 6,161,062 | A * | 12/2000 | Sicre et al. | 701/3 |
| 6,405,107 | B1 * | 6/2002 | Derman | 701/3 |
| 6,571,166 | B1 | 5/2003 | Johnson et al. | |
| 7,280,896 | B2 * | 10/2007 | Morizet et al. | 701/3 |
| 7,382,284 | B1 | 6/2008 | Armstrong et al. | |
| 2008/0191903 | A1 * | 8/2008 | Dubourg et al. | 340/958 |
| 2010/0039295 | A1 | 2/2010 | Dubourg et al. | |
| 2011/0046868 | A1 * | 2/2011 | Michel et al. | 701/120 |
| 2012/0215385 | A1 * | 8/2012 | He et al. | 701/3 |

FOREIGN PATENT DOCUMENTS

| | | | |
|---|---|---|---|
| CA | 2 613 740 | A1 | 1/2007 |
| WO | WO2007006762 | A2 * | 7/2006 |
| WO | 2008/043763 | A1 | 4/2008 |

* cited by examiner

*Primary Examiner* — Mary Cheung
*Assistant Examiner* — Frederick Brushaber
(74) *Attorney, Agent, or Firm* — Baker & Hostetler, LLP

(57) ABSTRACT

An aircraft guidance system for assisting in airport navigation includes: at least one airport database comprising topology data of an airport, called airport DB; at least one configuration database comprising aircraft configuration data and the position of a guidance point; a positioning system delivering aircraft kinematic and attitude parameters; at least one computer generating a 2D view of the representation of the airport notably comprising navigation indications and a representation of the aircraft; and at least one display for displaying the representation of the airport. In the system, a first symbol is generated on the display indicating the position of an early guidance point, corresponding to the position of the guidance point at a future time.

8 Claims, 6 Drawing Sheets

AIRCRAFT GUIDANCE SYSTEM FOR ASSISTING IN AIRPORT NAVIGATION

CROSS-REFERENCE TO RELATED APPLICATIONS

This application claims priority to foreign France patent application No. 0903846, filed on Aug. 4, 2009, the disclosure of which is hereby incorporated by reference in its entirety.

FIELD OF THE INVENTION

The present invention relates to the field of guidance systems for aircraft designed to assist in airport navigation. Notably, the field of the invention relates to the navigation systems that display information intended for assistance in taxiing. More specifically, the invention relates to the systems that generate, overlaid on a map of the airport on a display, a symbology enabling the aircraft to be piloted by sight and a guidance setpoint.

BACKGROUND OF THE INVENTION

Currently, there are systems that enable aircraft to follow a precise trajectory on an airport. They are particularly critical when:

the size of the landing gears is close to the size of the lanes on which the aeroplane is taxiing;

the trajectories are curved;

visibility is reduced.

Notably, in the case of the Airbus A380, the size of the gears is approximately 17 metres and the size of a traffic lane is 23 metres and the first point that the pilot can see is 20 metres from the nose.

To address the aircraft guidance constraints during the ground taxiing phases in an airport, one solution that exists on the A380 is to equip the cockpit with a video system enabling the position of the gears to be seen under the fuselage.

However, other solutions make it possible to generate a particular symbology projected onto a "head up" display screen. Some of these systems are described in the following patents:

"OptoElectronic Device for assisting aircraft taxiing comprising dedicated imaging", the reference of which is CA 2613740;

"Guiding and Taxiing assistance optoelectronic device for an aircraft having a dedicated symbologie", the reference of which is WO 2008043763;

"Airport surface operation advisory system", the reference of which is U.S. Pat. No. 6,571,166 B1;

"Aircraft surface operations guidance on head up display", the reference of which is U.S. Pat. No. 7,382,284 B1.

In the first patent, the reference of which is CA 2613740, a so-called "head up" display screen shows a projected 2D plan view which makes it possible in particular to position the gears relative to the traffic lanes, which are also referred to, in aeronautical terminology, as taxiways.

The pilot can then, while taxiing, assess the situation of the aircraft relative to the runway or to the taxiways.

One drawback is that this solution, even though it provides a good control tool, does not make it possible to manoeuvre the aircraft easily in turns.

The second patent, the reference of which is WO 2008043763, is based on the guidance point concept.

Such a guidance point is specific to each type of aircraft and is situated between the nose wheel and the main landing gear. In practice, for large aircraft, neither the nose wheel nor the main landing gear can follow the centre line in the curves without one of the gears being located outside the taxiway. However, the calculation of a guidance point makes it possible to guide the aircraft on the taxiway by keeping the ground projection of this point on the centre line. When the projection of the guidance point is substantially on the centre line, then the landing gears and the nose wheel are assured of not departing from the taxiway.

In FIG. 1, the guidance point G is projected onto the centre line at a point P. The system makes it possible to calculate the angular deviation 4 and represent this deviation in a guidance symbology on a head up display screen.

The point A situated in front of the aircraft, said aircraft following a heading 2, represents the position of the nose wheel. The landing gear 1 comprises a centre A' situated on the longitudinal axis of the aircraft. The point T is an early point making it possible to pilot, notably in a turn 3, the position of the point G with a margin for manoeuvre. The point T' is the projection of the point T on the centre line. This system makes it possible to keep the landing gear and the nose wheel of the aircraft on the taxiway.

This mechanism is described more specifically in the patent WO 2008/043763 A1.

When the pilot uses the position of the point G to guide the aircraft in the taxiing phases, one drawback of this system is that the point G does not make it possible to guide the aircraft with an anticipation time, the pilot is always making up a deviation between the centre line and the position of the point G.

When the pilot uses the position of the point G to guide the aircraft in the taxiing phases, one drawback of this system is that the position of the point T makes it possible only to alert the pilot when a trajectory deviation becomes too great. This point does not make it possible to guide the aircraft from a setpoint. As previously, the pilot is always making up a trajectory deviation. Consequently, piloting is uncomfortable and is handled in fits and starts when the aircraft drifts from its trajectory.

In the third patent, the reference of which is U.S. Pat. No. 6,571,166 B1, a system uses another guidance symbology representing a taxiing director representing the current centre line of the taxiway, and an aeroplane symbology situated either side of the centre line relative to the position of the centre of the fuselage of the aircraft likened to the guidance point.

However, this symbology does not make it possible to anticipate the manoeuvres in a turn. In practice, the pilot controls the nose wheel and becomes aware only after a delay of the effects of his manoeuvres on the guidance symbol.

Furthermore, for the large carriers of A380 type or even the Airbus A340-600 family of aircraft, it is sometimes necessary to have both the nose wheel and the rear gears off-centre in a tight turn in order to keep all the wheels on the taxiway. This situation requires the pilot to have an early awareness of the movement of the wheel and of the gears. This constitutes a drawback and a risk for the safety of the aircraft.

The fourth patent, the reference of which is U.S. Pat. No. 7,382,284 B1, introduces a guidance symbology in the form of a conforming view and in the form of a non-conforming 2D view.

The symbology is based on the anticipation of a point called "control point", and it uses two items in the display of the representation of the taxiway and of the aircraft.

First of all a target, denoted "taxi guidance cue", indicates the required position of the control point if the trajectory is to be followed. And secondly, a vector, denoted "trend vector", indicates the estimated position of the control point.

The aim, for the pilot, is to place the point of the "trend vector" in the "taxi guidance cue".

However, guidance on the ground has precise characteristics that pose problems for this type of symbology.

In practice, on the ground, the pilot has external references such as the centre lines, also considered and denoted in aeronautical terminology as "guidance lines", painted in the centre of the taxiways. Said guidance lines constitute a natural reference for the pilot enabling the aircraft to be piloted on the taxiway.

However, there may be a conflict between the trajectory of a centre line and the guidance symbology. In particular, this case arises when the pilot has to consciously manoeuvre the nose wheel away from the centre line in a turn in order to keep his landing gear on the taxiway. Notably, the pilot could feel disturbed by the fact that the guidance symbology is no longer totally in agreement with the plot of a centre line.

Furthermore, the ground taxiing constraints are severe; notably, certain turns imposed by the topology of the airport are much tighter on the ground, with a radius of curvature of around 50 metres. Thus, one drawback of this solution is that on approaching such turns, the "taxi guidance cue" is displaced at a stroke, very rapidly, and may even depart from the pilot's field of vision. Keeping the "trend vector" in the "taxi guidance cue" then becomes a very arduous task for the pilot. The pilot has the impression of "running" after his guidance symbol without being able to catch up with it.

Finally, the symbology proposed in this last patent requires a route to be followed to be entered into the system, said route to be followed also being called "taxiing plan", in order to be able to generate the taxi guidance cue along the trajectory to be followed.

On the ground, the route to be followed on the airport is dictated by the controller to the crew, this route also being referred to in aeronautical terminology as "cleared route". One drawback lies in the fact that, in most flight management systems, the interfaces allow a flight plan to be entered but, at the present time, there is no system enabling a cleared route to be entered into the aeroplane system.

The invention makes it possible to mitigate the abovementioned drawbacks.

SUMMARY OF THE INVENTION

One aspect of the invention is to generate a guidance symbology that takes account of the specific features of taxiing on the ground. Advantageously, the invention makes it possible to generate a symbology from the position of an early guidance point representing the position of the guidance point at a near future time. The invention therefore makes it possible to use the centre line of the taxiways as guidance setpoint while having a lead time on the manoeuvres that allows the trajectory of the aircraft to be followed.

This symbology is therefore advantageously not in contradiction with the guidance lines of the taxiways. In particular, the invention enables the pilot to anticipate and negotiate any type of turn while keeping the landing gears within the limits of the taxiway. Furthermore, the invention makes it possible to taxi even if the route to be followed received from air traffic control is not known to the system.

Advantageously, the aircraft guidance system for assisting in airport navigation comprises:

- at least one airport database comprising topology data of an airport, called airport DB;
- at least one configuration database comprising:
  - on the one hand, aircraft configuration data, including the aircraft type, the position of the landing gears, the position of the nose wheel;
  - on the other hand, the calculation of the position of a guidance point calculated from the position of the nose wheel and of the landing gears, and a condition according to which maintaining the position of the guidance point on the centre line of the traffic lanes makes it possible at all times to ensure that the nose wheel and the landing gears are on the traffic lane;
- a positioning system delivering aircraft kinematic and attitude parameters, including the position of the aircraft, its speed, its acceleration and its heading;
- at least one first computer which:
  - from the airport DB, generates a 2D view of the representation of the airport notably comprising the representation of the traffic lanes, of the landing and takeoff runways, of the parking areas, of the navigation indications, and;
  - from the positioning system and from the configuration data, generates a first representation comprising the representation of the aircraft and a symbology comprising navigation aid symbols;
- at least one display for displaying the first representation.

Advantageously, the system allows a first symbol to be generated by a second computer and said symbol to be displayed on the display, the symbol indicating the position of an early guidance point, corresponding to the position of the guidance point at a future time, the position of the early guidance point being calculated from the current position of the guidance point, at least the instantaneous speed of the aircraft and its heading.

Advantageously, the position of the early guidance point is calculated according to the acceleration of the aircraft.

Advantageously, the first computer generates navigation indications comprising the trajectory of the centre line and the width of the traffic lane on which the aircraft is located and the lanes that are connected to it and that are close to said aircraft, said aircraft being represented on the display.

Advantageously, the first symbol is a cross or a star.

Advantageously, a second symbol is generated by the second computer indicating the manoeuvre setpoint to be applied in order to make the early guidance point and the centre line coincide.

Advantageously, the second symbol is a lateral arrow indicating a manoeuvre direction.

Advantageously, the first and the second computers are the same computer.

Advantageously, the representation of the aircraft overlaid on the map of the airport is calculated from its position, its attitude and the position of the landing gears.

BRIEF DESCRIPTION OF THE DRAWINGS

Other features and advantages of the invention will become apparent from the following description, given in light of the appended drawings which represent.

DETAILED DESCRIPTION

Figure 1:
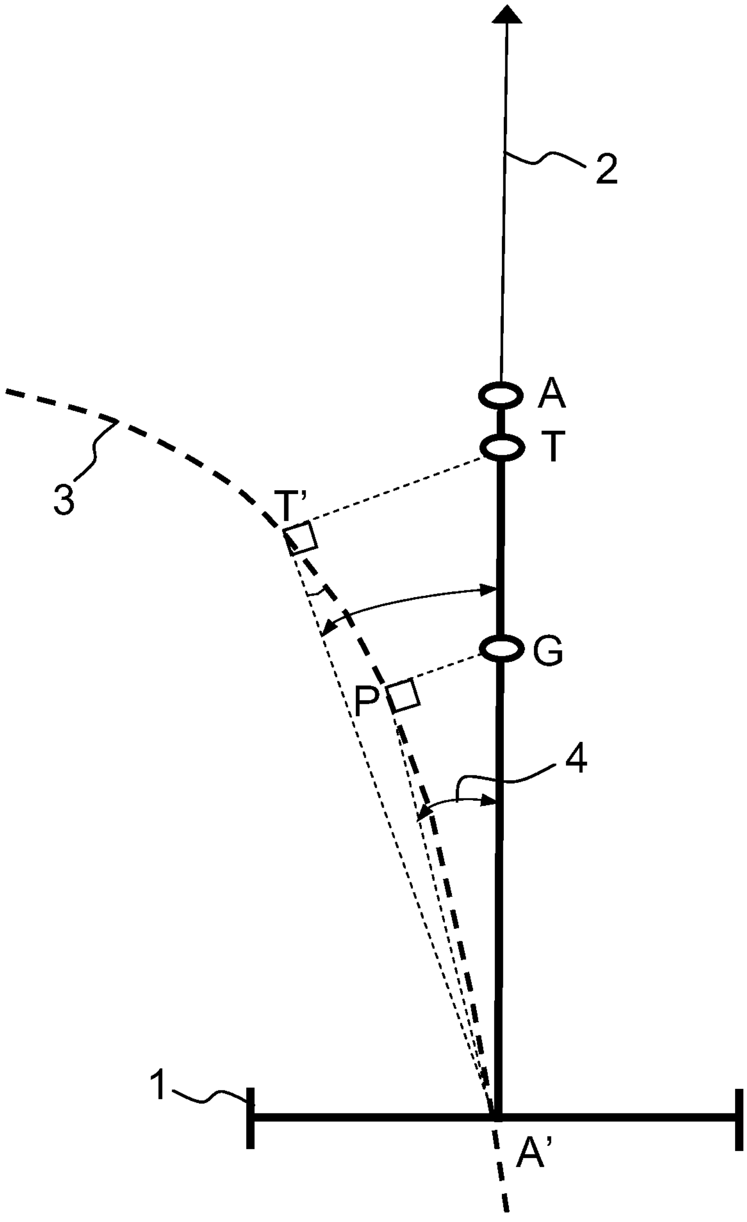
FIG. 1: an aircraft guidance system according to the prior art.
Figure 2:
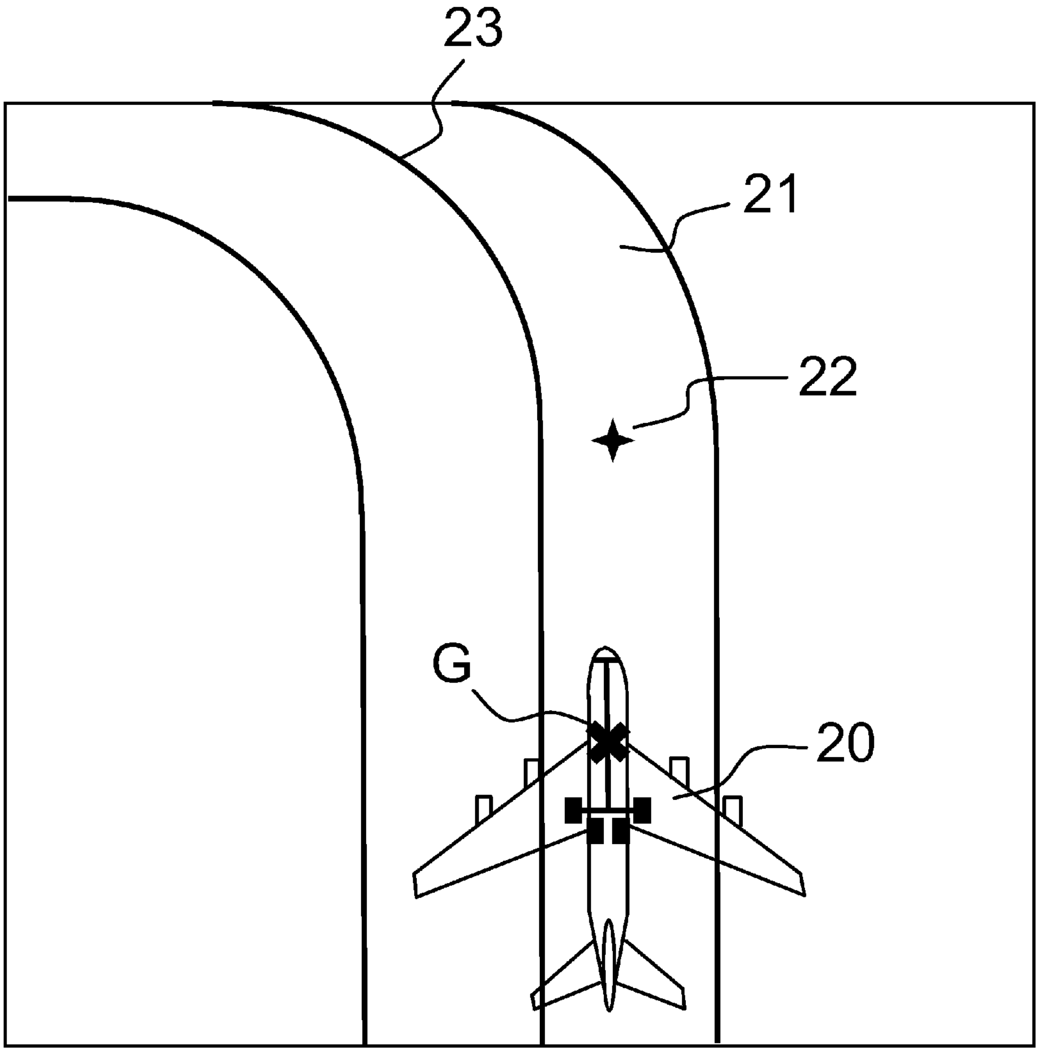
FIG. 2: a display including an early guidance point according to the system of the invention.

FIG. 2 represents a display in a cockpit display screen representing an aircraft 20 which is the aircraft in which the pilot is at the controls, a runway or a taxiway 21 of an airport, the centre line of the taxiway 23.

FIG. 2 finally represents a guidance point G, the position of which is situated between the nose wheel and the landing gears, on the longitudinal axis of the aircraft.

Furthermore, the position of the guidance point depends on each aircraft. It is calculated so that, in a taxiing phase of the aircraft on a taxiway including a centre line, when the position of the projection of the guidance point on the ground follows this centre line, the landing gears and the nose wheel cannot depart from the taxiway or the runway.

When the guidance point is displayed overlaid on the 2D map representing the aircraft and a part of the airport, one advantage is that the marking on the ground, notably the centre line, becomes a natural guidance setpoint.

The invention makes it possible to define a point 22, denoted early guidance point, which corresponds to the guidance point of the aircraft at a near future time.

The invention consists of no longer using as guidance setpoint a position of a control point at a given moment, but instead using all of the trajectory to be followed represented by the guidance line. Typically, in the case of FIG. 2, the pilot must bring the early guidance point onto the centre line 23.

The centre line painted on the taxiway is therefore also called a guidance line in the context of the invention, given that it is used as a guidance setpoint.

It therefore makes it possible to guide the aircraft from the position of the early guidance point.

The 2D view of FIG. 2 also makes it possible to check by sight the position of the landing gears and the nose wheel on the taxiway or on the runway.

The centre line 23 represented in this 2D view makes it possible to improve the awareness of the situation because it includes the guidance setpoint, the situation of the aircraft and its position on the taxiway.

One advantage of the solution of the invention is to use the identifiers and the natural marks of the airport as guidance setpoints, which means that the screen shown to the pilot is not overloaded with information, notably with setpoints, markings and indications. This constitutes a convenience for guidance because of the factorization of the elements represented on the screen.

One consequence is that there is no longer any contradiction between the airport identification markings and the guidance setpoints, since the centre line constitutes both an airport marker and a guidance setpoint.

Furthermore, this setpoint is stable in time because it is fixed. This setpoint seen by the pilot depends on the scrolling speed in the 2D view, in other words the speed of the aircraft on the ground, generally low when taxiing, notably less than 30 knots. Furthermore, this setpoint no longer depends on the radius of curvature of the turns.

In the 2D view of FIG. 2, a first symbol is overlaid on the representation of an airport taxiway. One embodiment makes it possible to generate a cross or a star representing a prediction of the position of the guidance point at the end of a given time; this is the early guidance point. A preferred prediction time in one embodiment is, for example, 3 seconds.

In a first variant embodiment, the position of the early guidance point is calculated according to the current position of the guidance point, of the speed vector and of the acceleration vector of the aircraft.

Piloting aircraft is advantageously simplified. In practice, the pilot who is at the controls of the aircraft must keep the position of the early guidance point on the guidance line.

One advantage is that the pilot can anticipate the movements beyond the position of the early guidance point because he can see the trajectory of the guidance line on a display that serves as a setpoint for him beyond the estimated position of the guidance point.

Figure 3:
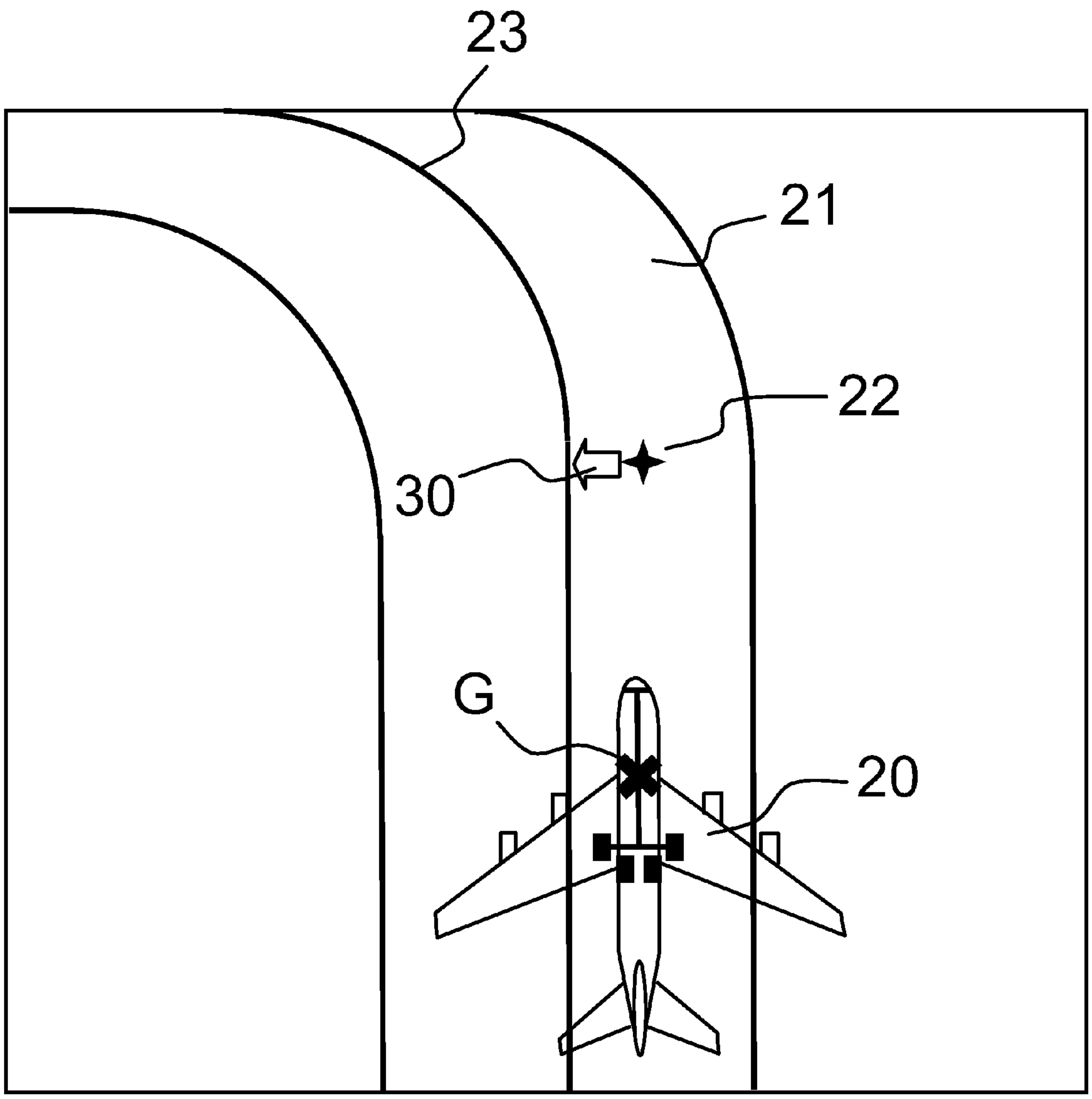
FIG. 3: a display including an early guidance point and a setpoint according to the system of the invention.

FIG. 3 represents another variant embodiment in which a second symbol is added. The second symbol represents an arrow indicating the direction in which to manoeuvre the aircraft to bring it to the taxiing setpoint, that is to say the centre line.

In practice, in FIGS. 2 and 3, the aircraft must turn to the left to align the position of the early guidance point on the guidance line.

Figure 4:
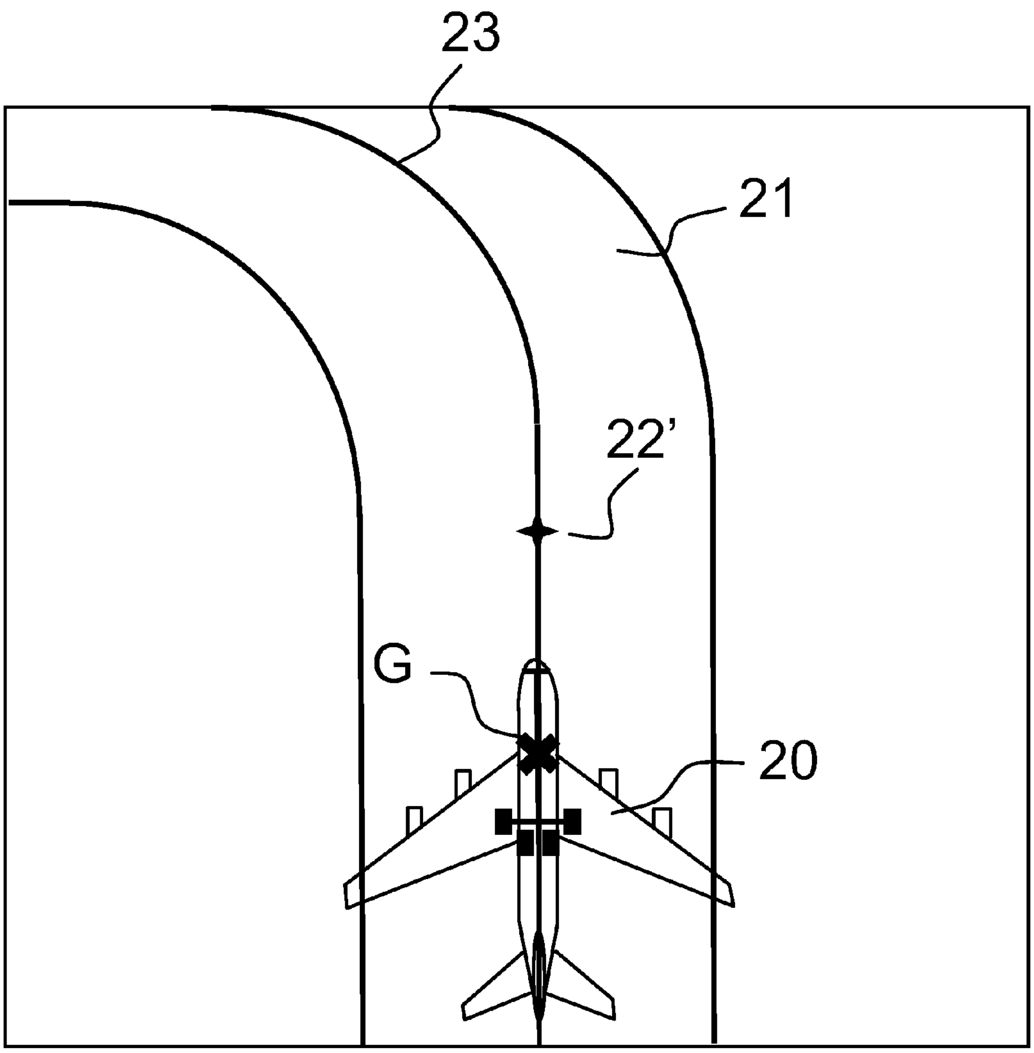
FIG. 4: a display including an early guidance point along the centre line according to the system of the invention.

FIG. 4 represents the aircraft correctly placed relative to the guidance setpoint. The early guidance point is on the guidance line. One advantage when the setpoint is observed is to be able to anticipate the next action; notably, in this case in point, the pilot sees in his 2D view the turn to the left and can begin to anticipate the turn.

The invention also makes it possible to guide the aircraft without having to enter the route to be followed into the computer. The system does not need to know the route to be followed in order to generate a predictive symbology to assist in taxiing. In practice, the only representation on the 2D view of taxiways and of one or more centre lines, one of which constitutes a guidance line known to the pilot, being situated around the aircraft, enables the pilot to manoeuvre the aircraft.

The pilot does therefore not need to enter parameters defining a taxiing setpoint into the system.

Figure 5:
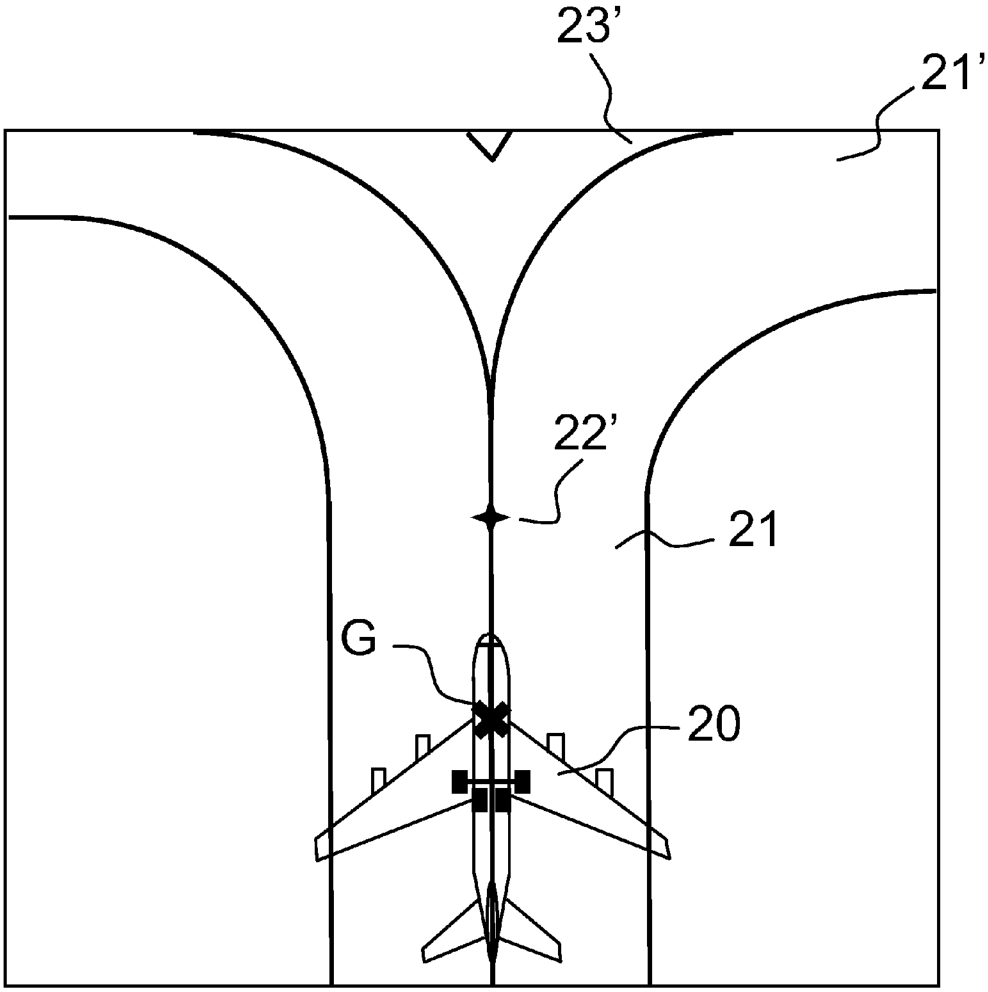
FIG. 5: a display including an early guidance point in an intersection case according to the system of the invention.

FIG. 5 represents a case in which the route to be followed is not known to the avionic system, with the aircraft approaching an intersection. The pilot can either manoeuvre the aircraft onto the taxiway 21" or onto the taxiway 21' by keeping the position of the early guidance point on one of the centre lines.

In a situation in which the guidance setpoints are received by radio channel from air traffic control, the pilot can pilot the aircraft by following the radio setpoints indicating the correct taxiway to be followed while keeping the position of the early guidance point on the right guidance line.

For example, in FIG. 8, the pilot aligns the position of the early guidance point with the guidance line 23' on the right which corresponds to the route 21' to be followed.

Advantageously, in one embodiment, the 2D representation of the airport is ideally projected into a "head up" display. In a second embodiment, it can also be displayed on one of the cockpit instrumentation panel screens.

In particular, it can also be used with an electronic airport map in the following conditions:

- guidance lines are represented on the airport map;
- an aeroplane model is represented on the map;
- there is a mode in which the aeroplane model is always in a fixed position and the map scrolls under it;
- the scale is notably tailored to the local situation around the aircraft.

The inventive system comprises the generation of a guidance symbol in a 2D plan view of the aircraft overlaid on a drawing of a trajectory, notably of the centre line and of a regulatory width of this taxiway.

Figure 6:
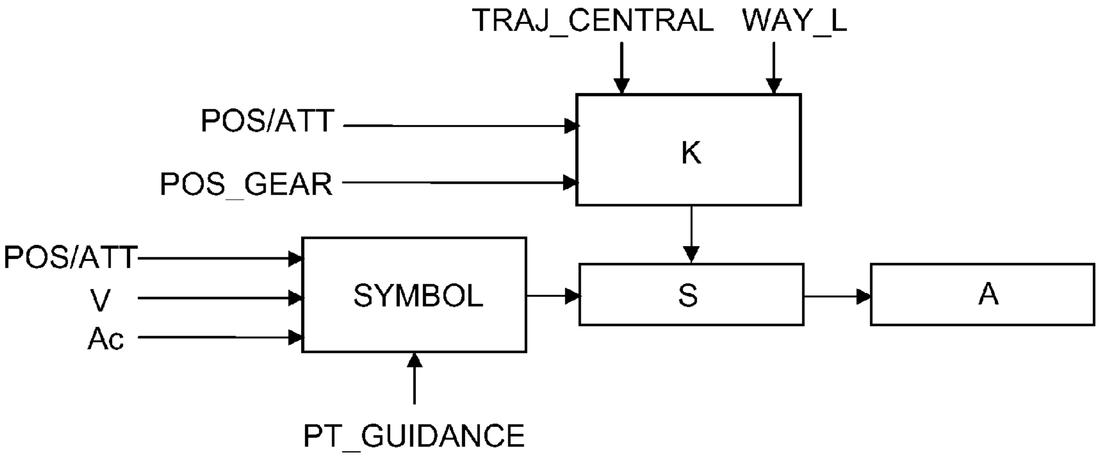
FIG. 6: a functional diagram of the means that have to be implemented to produce a system according to the invention.

FIG. 6 represents a functional diagram of the means that have to be implemented in order to produce a system according to the invention.

A first component, denoted SYMBOL, makes it possible to generate at least one guidance symbol, notably the position of the early guidance point. It may be a cross or a star, or any other representation indicating the position of a point on a 2D view.

The input parameters are used to calculate the position of the early guidance point in an aeroplane frame of reference.

Notably, a preferred embodiment makes it possible to calculate the position of the early guidance point from:

- on the one hand, the position and the attitude of the aircraft, denoted POS/ATT, its speed vector V and its acceleration Ac, and;
- on the other hand, the definition of the guidance point of the aircraft, denoted PT_GUIDANCE, notably its calculated position on the longitudinal axis of the aircraft.

The guidance point depends on the type of aircraft. Moreover, the speed vector indicates that it is necessary to know its instantaneous speed and the instantaneous heading of the aircraft.

A second component, denoted K, is a computer used to generate the 2D plan view of the airport in a local environment of the aircraft. Input parameters are used to generate the view of the aircraft overlaid on the taxiways.

Notably, a preferred embodiment makes it possible to generate a 2D view from:

- on the one hand, characteristics of the taxiways close to the aircraft, notably the position of the centre lines and the width of the runways, in particular of the centre line on which the aircraft is moving, denoted TRAJ_CENTRAL, and its width denoted WAY_L, and;
- on the other hand, the position and the attitude of the aircraft POS/ATT and the position of the landing gears POS_GEAR.

A third component S makes it possible to apply the overlaying:

- on the one hand, of the 2D map representing the aircraft overlaid on the taxiways of the airport, and;
- on the other hand, of the symbology generated from the first component.

The duly constituted image is displayed in a display A. The display may be a head up display onto which the image is projected, or on a head down display screen.

The invention comprises many advantages, notably:

- simplified use of pilot actions, notably the pilot directly sees his action on the guidance symbol by acting on the nose wheel;
- the use of a simple setpoint that is naturally present on the airport plots; for this, the early guidance point makes it possible to follow this trajectory in order to pilot the aircraft;
- improved awareness of the situation in the vicinity of the aircraft allowing for better anticipation in the piloting manoeuvres; notably, since the setpoint is embodied by the centre line, the pilot can easily anticipate the turns that he can see coming up on the 2D view;
- an additional speed indication allows for more flexible manoeuvring of the aircraft; notably, the guidance symbol supplies an indication as to its speed since the faster the aircraft is moving, the more distant the guidance symbol is in front of the nose of the aeroplane.

The invention claimed is:

1. An aircraft guidance system for assisting in airport navigation, comprising:

- at least one airport database comprising topology data of an airport, called airport DB;

- at least one configuration database comprising:
  - aircraft configuration data including an aircraft type, a position of landing gear including a position of a nose wheel;
- a calculation of a current position corresponding to a position of a guidance point at the current instant, the guidance point being situated between the nose wheel and the landing gear calculated from the position of the nose wheel, the position of the landing gear, and from a condition according to which maintaining the position of the guidance point on a centre line of the traffic lanes makes it possible at all times to ensure that the nose wheel and the landing gears are on the traffic lane;
- a positioning system delivering aircraft kinematic and attitude parameters, including the position of the aircraft, its speed, its acceleration and its heading;
- at least one first computer which:
  - from the airport DB, generates a 2D view of the representation of the airport notably comprising a representation of traffic lanes, of landing and take-off runways, of parking areas, and of navigation indications, and;
  - from the positioning system and from the configuration data, generates a first representation comprising a representation of the aircraft and a symbology comprising navigation aid symbols;
- at least one display for displaying the first representation, wherein the system allows a first symbol to be generated by a second computer and said symbol to be displayed on the display, the symbol indicating a position of an early guidance point, corresponding to a prediction of the position of the guidance point at a future instant later than the current instant, the position of the early guidance point being calculated from at least the current position of the guidance point, the instantaneous speed of the aircraft and a heading of the aircraft.

2. The aircraft guidance system for assisting in airport navigation according to claim 1, wherein the position of the early guidance point is calculated according to an acceleration of the aircraft.

3. The aircraft guidance system for assisting in airport navigation according to claim 1, wherein the first computer generates navigation indications comprising a trajectory of the centre line and a width of the traffic lane on which the aircraft is located and lanes that are connected to it and that are close to said aircraft, said aircraft being represented on the display.

4. The aircraft guidance system for assisting in airport navigation according to claim 1, wherein the first symbol is a cross or a star.

5. The aircraft guidance system for assisting in airport navigation according to claim 1, wherein a second symbol is generated by the second computer indicating a manoeuvre setpoint to be applied in order to make the early guidance point and the centre line coincide.

6. The aircraft guidance system for assisting in airport navigation according to claim 5, wherein the second symbol is a lateral arrow indicating a manoeuvre direction.

7. The aircraft guidance system for assisting in airport navigation according to claim 5, wherein the first and the second computers are the same computer.

8. The aircraft guidance system for assisting in airport navigation according to claim 5, wherein the representation of the aircraft is overlaid on a map of the airport to scale, the latter being calculated from the aircraft type, its position, its attitude and the position of the landing gear.

* * * * *